J. H. PRESTON.
TIRE.
APPLICATION FILED JAN. 18, 1916.
1,205,930.
Patented Nov. 21, 1916.
3 SHEETS—SHEET 1.
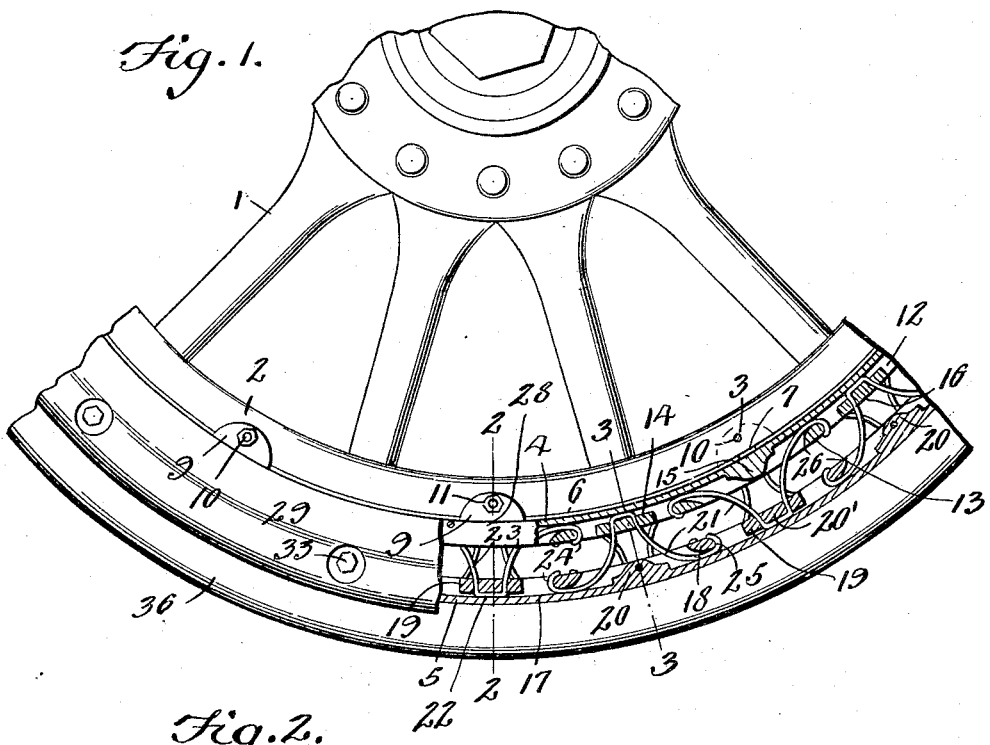
Fig. 1.
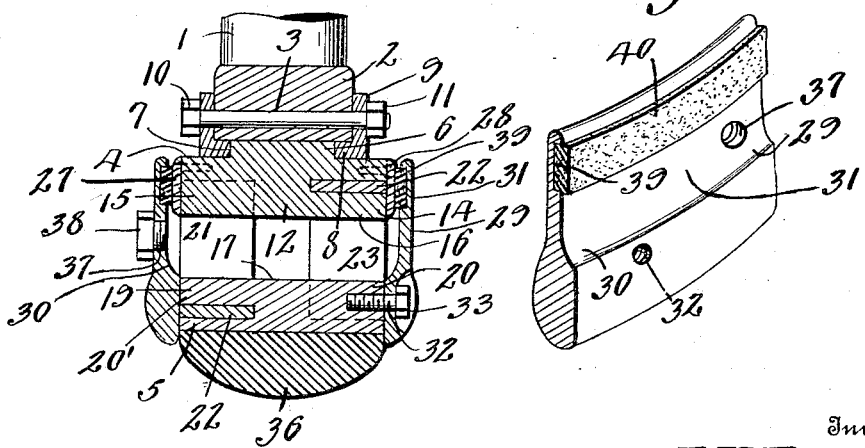
Fig. 2.
Fig. 3.
Witnesses
Inventor
J. H. Preston,
By Victor J. Evans
Attorney J. H. PRESTON.
TIRE.
APPLICATION FILED JAN. 18, 1916.
1,205,930.
Patented Nov. 21, 1916.
3 SHEETS—SHEET 2.
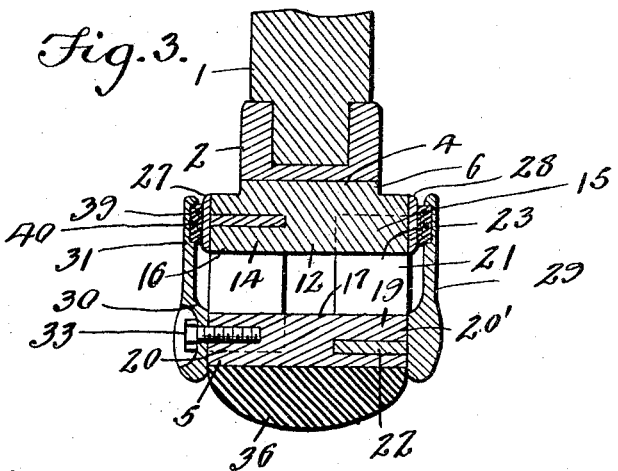
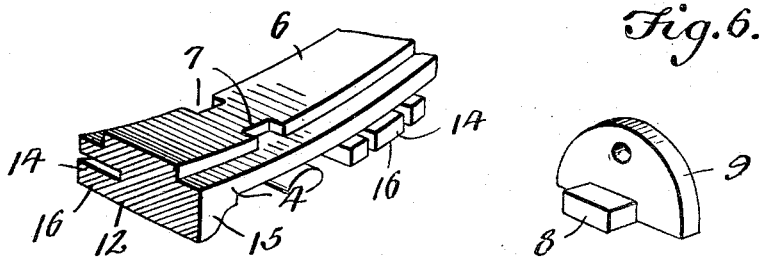
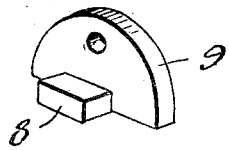
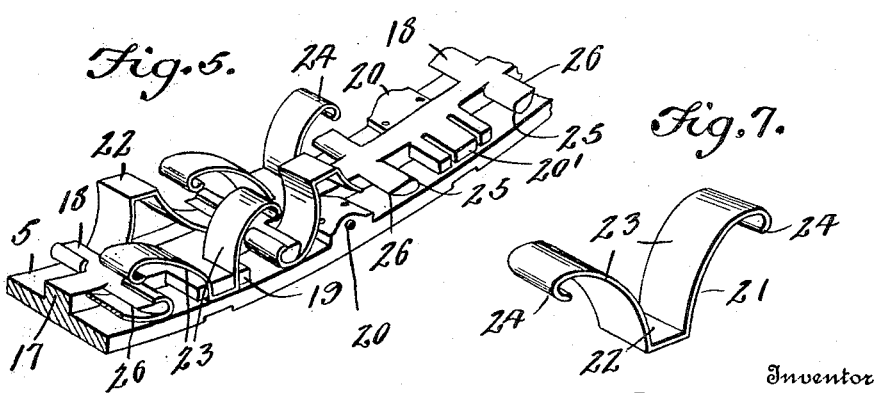
Witnesses
Inventor
J. H. Preston,
By Victor J. Evans
Attorney

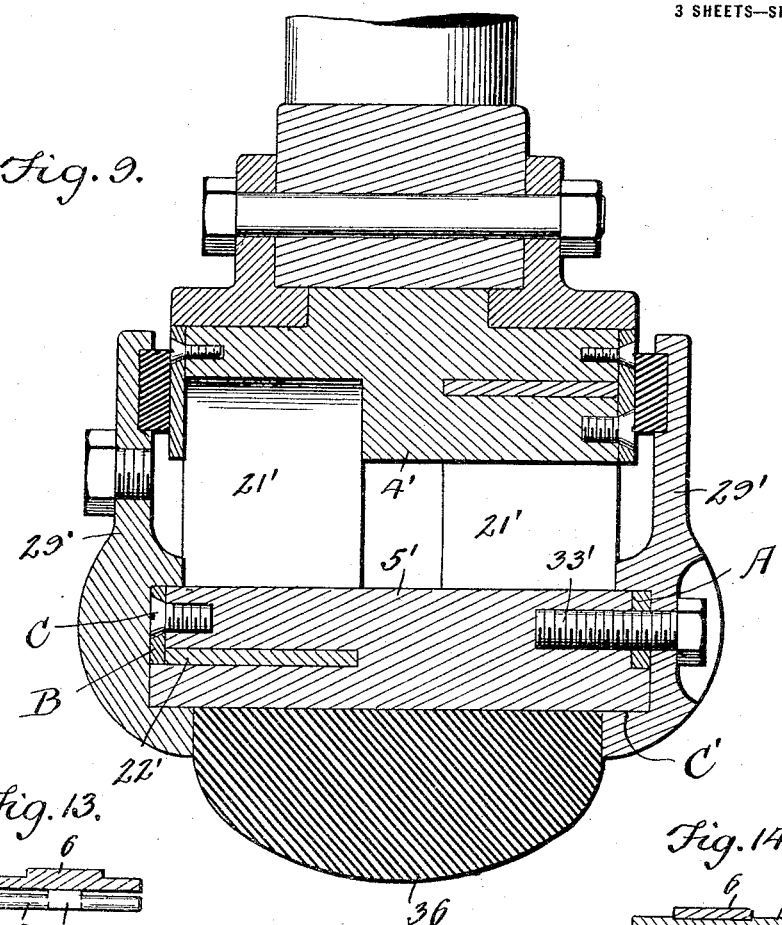

UNITED STATES PATENT OFFICE.

JAMES HENRY PRESTON, OF MEDICINE HAT, ALBERTA, CANADA.

TIRE.

1,205,930.   Specification of Letters Patent.   Patented Nov. 21, 1916.

Application filed January 18, 1916.   Serial No. 72,846.

*To all whom it may concern:*

Be it known that I, JAMES HENRY PRESTON, a subject of the King of Great Britain, residing at Medicine Hat, in the Province of Alberta and Dominion of Canada, have invented new and useful Improvements in Tires, of which the following is a specification.

The present invention relates to improvements in tires for vehicle wheels.

In carrying out my invention it is my purpose to construct a spring tire which will afford a resiliency at least equaling that of a pneumatic tire and which may be easily and quickly arranged upon the felly of any ordinary vehicle wheel.

It is also my purpose to provide a tire including a system of springs, so arranged that all vibration caused by the uneven surfaces over which the vehicle travels will be absorbed without occasioning the shock or jar to the vehicle having its wheels provided with my tire, and to further provide side plates for the springs which while removable to permit of the insertion or the removal of said springs will afford a housing for the springs to effectively protect the same from dust, dirt, or like substances which might effect the resiliency of the springs.

It is a further object of the invention to provide a spring tire in which the springs are inclosed, to insure the preservation of the springs as well as to silence the operation of the tire.

A still further object of the invention is the peculiar construction of the inner and outer bands providing the tire, whereby spring members also of a peculiar construction may be secured to one of the bands and arranged in contacting relation with the other band, the said springs being all of a similar construction but being reversely positioned so that the springs are removable and interchangeable.

A still further object of the invention is the simple and effective means for locking the tire upon the felly of a wheel, so as to effectively prevent either the lateral or circumferential movement of the said tire when so positioned, but at the same time provide for the ready removal of the tire from the felly when desired.

With the above and other objects in view, the improvement resides in the construction, combination and arrangement of parts set forth in the following specification and falling within the scope of the appended claims.

In the drawings, Figure 1 is a side elevation of a portion of a vehicle wheel provided with my improvement, parts of the tire being broken away, and parts being shown in section. Fig. 2 is an enlarged transverse sectional view approximately on the line 2—2 of Fig. 1. Fig. 3 is a similar sectional view approximately on the line 3—3 of Fig. 1. Fig. 4 is a perspective view of a portion of the inner rim. Fig. 5 is a similar view of a portion of the outer rim, certain of the springs being shown in position upon the said rim. Fig. 6 is a perspective view of one of the securing clips. Fig. 7 is a similar view of one of the springs. Fig. 8 is a detail perspective view of a portion of one of the side plates showing the compressible member arranged thereon. Fig. 9 is an enlarged transverse sectional view through the tire and illustrating a slight modification. Fig. 10 is a perspective view of a portion of the outer rim illustrating a different manner of arranging the springs thereon. Fig. 11 is a section of one of the rims comprising two members, and Figs. 12 to 14 illustrate cross sectional modifications of the rim member.

In the drawings, the wheel is designated by the numeral 1, and, of course, includes a felly 2, which in the present instance, at spaced intervals is provided with transverse openings 3.

My improvement contemplates the employment of an inner rim 4, and an outer rim 5, which surrounds the inner rim and is spaced therefrom by spring members which will presently be described. The inner rim 4 upon its outer periphery is centrally formed with a thickened portion 6 which extends the circumferential length of the said rim and which is of a width equaling the width of the felly 2. This annular member 6 is provided, at spaced intervals, upon its opposite edges with notches 7, the said notches being disposed opposite the transverse openings 3 in the felly of the wheel, and the said notches are adapted to receive offset lugs 8 provided upon clip members 9. These clips are adapted to be arranged against the opposite faces of the felly 2 and are provided with openings through which pass bolts 10 having retaining nuts 11, the head of each of the bolts contacting with one of the clips and the bolt 11 engaging with the clip diametrically opposite that engaged by the said head of the bolt. By this arrangement it will be noted that the inner rim 4 may be easily and quickly positioned upon the felly of the wheel.

The rim proper extends a suitable distance beyond the opposite sides of the annular enlargement 6 and the inner face of the said rim is centrally provided with a circumferential rib 12. This rib may be integrally formed with the rim or may comprise a separable member which is secured to the rim and the said rib is provided at spaced intervals with diametrically oppositely disposed laterally extending fingers 13—13. The rib 12 is further provided with laterally extending block members 14 disposed in staggered relation central between each alternating pairs of fingers 13; that is, a block is provided upon one side of the rib between a certain pair of fingers and upon the opposite side of the rib between the next pair of fingers, and also arranged upon the inner rim 4 diametrically opposite each of the blocks 14 is an ear 15. These ears may be formed integral with the rib 12 or the same may comprise separable elements which are secured to the rim, as shown in the drawings. Each of the blocks 14 is centrally slotted longitudinally adjacent the opposite ends of the said block, thus providing the central portion of each of the blocks with a tongue 16.

The outer rim 5 is likewise provided with a central circumferential rib 17, the said rib having disposed spaced fingers 18—18 and being provided upon its opposite sides with blocks 19 arranged similar to the arrangement of the blocks 14 upon the inner rim 4, and the said outer rim 5 is further provided with ears 20. The blocks 19 are slitted so that each of the same is provided with a central tongue 20; and the blocks 19 of the outer rim 5 are adapted to be disposed opposite the ears 15 upon the inner rim 4, and in a like manner the blocks 14 of the inner rim are disposed opposite the ears 20 of the outer rim.

The spring members are designated by the numerals 21, each of the same comprising a flat body portion 22 from which extends in opposite and outward directions arms or wings 23—23 which terminate in rounded portions forming hooks 24—24. The body 22 and the portions of the arms or wings 23 formed with the said body are adapted to be received by the tongues 16 and 20 of the blocks 14 and 19 of the inner and outer rims, while the hooked ends of the arms or wings of the spring members upon the outer rim engage with the fingers 13 upon the inner rim, and likewise the hooked ends 24 of the springs upon the inner rim engage with the fingers 18 of the outer rim. In order that the hooked ends of the springs will effectively grip the fingers 13 and 18, the said fingers are substantially cone-shaped in cross section; that is, the sides of the fingers disposed adjacent the opposite sides of the blocks are rounded, as at 25, and are inclined from the said rounded portions to the opposite side of each of said fingers terminating in a pointed or sharpened edge 26 so that one of the horizontal surfaces of each of the fingers conforms to the shape of the rounded or angular sides 23 of each of the springs at the hooked end thereof, and the said hooked end will snugly engage with the rounded portions 25 of the said fingers. When the springs are thus positioned annular bands 27 and 28 are secured to the opposite edges of the inner rim 4, the said bands being of a width sufficient to retain the springs received in the blocks and engaging with the fingers of said upper rim in proper position thereon.

The numerals 29—29 indicate annular bands which provide the side members for the tire. These sides 29 have their lower portions extending inwardly, as at 30, and continued in a line with the main portion or body 31 of each of the said sides, and the lower portions are provided with openings 32 which register with the central portions of each of the ears 20 upon the outer band 5, and the said ears are formed with threaded orifices. Passing through these openings 32 and engaging the orifices in the arms 20 are headed threaded members 33 which, of course, secure the sides to the outer rim 5. The outer periphery of the sides is projected a suitable distance beyond the outer surface of the rim 5, providing a passage or chamber for the reception of a compressible tread member 36, the same preferably comprising a band of solid rubber and the said tread may be secured between the extending portions of the side and to the outer circumferential face of the rim 5 in any desired or preferred manner. The body portions 31 of the sides 29 are provided each with one or more threaded openings 37 providing the same with a lubricating port or opening, and these ports are normally closed by a suitable threaded member 38. The side members 29, upon their inner faces and adjacent their inner edges are formed with substantially rectangular circumferential grooves 39 within each of which is arranged a friction band 40, the said band contacting with the ring members 28. These friction bands 40 are constructed of some suitable compressible material such as "Raybestos", or the like, and are adapted to prevent the escape of the lubricant from between the rims 4 and 5 as well as to effectively seal the passage provided between the said rims against the entrance of dust, dirt or other foreign matter which might injure or interfere with the tension of the springs. The friction bands 39 also tend to silence the compression of the outer rim toward the inner rim.

In Fig. 9 the structure is substantially similar to that previously described, except that the outer rim 5' is of a greater width than the rim 5 and also of a greater width than the inner rim 4', so that the sides of said outer rim project an equal distance beyond the sides of the inner rim. The outer rim 5', upon its sides from its inner edge is formed with an annular depression A, the said depressions receiving annular bands B which are arranged in contact with the connecting portions 22' of the spring members 21'. These bands B are provided at intervals with reamed openings, the rim 5' having alining threaded apertures, and the heads of threaded securing members C are arranged in the reamed openings and engage with the threads of the apertures in the rim. The bands B at other intervals are provided with round openings which register with comparatively deep annular apertures in the rim 5', the threads of said apertures receiving the shanks of the headed threaded members 33' that pass through openings in the side bands 29', as well as through the mentioned apertures in the annular bands B. The side members 29' have their inner faces, adjacent their outer edges, and at the thickened portions thereof recessed annularly, as at C' to receive the extending ends of the rim 5'. The tread 36 has its opposite sides contacted by the inner faces of the side members 29' which extend beyond the periphery of the rim 5'.

In Fig. 10 I have shown the outer rim 5ª constructed substantially similar to that previously described, and the blocks 19' formed with or connected to the circumferential rib 17' are disposed one directly opposite the other as are also the fingers 18' and the ears 20'. The blocks 19' are slitted longitudinally to provide the central tongues 20ª and the springs are constructed precisely as previously described. With this arrangement the side members or leaves 23' of the springs which are arranged in directly opposite pairs, extend in the same direction and the opposite direction to which the leaves extend alternate; that is, the leaves of the springs connected with the block of the outer rim will be arranged over and at an angle to the leaves of the springs connected to the blocks of the upper rim, it being understood that the upper rim is constructed similarly to that just described.

While I have illustrated and described the preferred form of arranging the springs, it will be apparent that I am not to be restricted to such precise arrangement as in the manufacture of the invention, other methods of constructing or arranging the springs may suggest themselves.

Having thus described the invention, what I claim is:

1. The combination with the felly of a wheel, of a tire for the said felly, said tire including inner and outer metallic rims, means secured to the felly arranged and received in notches in the inner rims for securing the inner rim to the felly, each of the rims having their adjacent faces provided with centrally arranged circumferential ribs, oppositely disposed laterally extending fingers upon the ribs, alternating block members projecting from the sides of the rib between each alternating pair of fingers, an ear upon each of the rims opposite each of the blocks and the block of one of the rims being disposed adjacent the ear of the opposite rim, spring members, each of said spring members including a straight body portion which is secured one to each of the blocks, outwardly extending angular arms formed upon the ends of each of the blocks of the spring, said arms terminating in hooks and the said hooks adapted to be engaged with the fingers upon the opposite rims, and annular side plates secured to the outer rim and inclosing the springs.

2. The combination with the felly of a wheel, of a tire including an inner rim and an outer rim surrounding the inner rim, means for securing the inner rim to the felly, each of the rims having their adjacent faces centrally formed with circumferential ribs, oppositely disposed laterally extending fingers for the ribs, block members extending laterally from the opposite sides of the ribs between each alternately arranged pairs of fingers, said blocks being centrally slitted to provide the same with tongues, ears disposed opposite each of the blocks, substantially U-shaped springs engaged between the tongues of the blocks, the arms of the springs terminating in hooks which receive the fingers of the respective rim members, and annular side plates secured to the outer rim and engaging with the sides of the inner rim and inclosing the springs.

3. A tire for wheels including an inner rim secured to the felly of the wheel and an outer rim surrounding the inner rim and spaced therefrom, laterally extending block members upon the rims and slitted longitudinally from their ends, laterally extending fingers upon the rims disposed between the blocks, springs, said springs including a central portion having oppositely disposed angularly arranged side leaves having hooked ends, said springs having their body portions arranged in slits in the blocks of the respective rims, and the hooked ends of their leaves engaging the lateral fingers of the opposite respective rims, flat annular bands upon the sides of the rims and inclosing the springs, and means for removably securing the bands to one of the rims.

4. A tire for wheels including an inner rim secured to the felly of the wheel and an outer rim surrounding the inner rim and spaced therefrom, said outer rim being of a greater width than the inner rim and having its opposite sides recessed from its inner edges, laterally extending slitted blocks formed with the rims, laterally extending fingers intermediate of the blocks, springs between the rims, said springs including each a central portion having its ends formed with angularly arranged side leaves which terminate in hooks, the connecting portion of the springs adapted to be inserted in the slits of the blocks from the ends of the said blocks of the respective rims, and the hook ends of the side members of the springs engaging with the fingers of the respective rings opposite the rim to which the spring is connected, side members for the rims, and means for removably securing the side members to one of the rims.

In testimony whereof I affix my signature in presence of two witnesses.

JAMES HENRY PRESTON.

Witnesses:
ERNEST BARTLETT,
EDWARD E. FIELDER.

Copies of this patent may be obtained for five cents each, by addressing the "Commissioner of Patents, Washington, D. C."